(12) United States Patent
Peters et al.

(10) Patent No.: US 6,397,072 B1
(45) Date of Patent: May 28, 2002

(54) SERVICE MEANS TO PROVIDE A SERVICE TO A USER, METHOD REALIZED BY SUCH A SERVICE MEANS AND A TELECOMMUNICATION NETWORK INCLUDING SUCH A SERVICE MEANS

(75) Inventors: Marco Johannes Hubertus Peters, NS Bergen op Zoom (NL); Jean Vosters, Temse (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/456,240

(22) Filed: Dec. 7, 1999

(30) Foreign Application Priority Data

Dec. 22, 1998 (EP) .............................................. 98403275

(51) Int. Cl.$^7$ ................................................ H04Q 7/20
(52) U.S. Cl. ........................ 455/456; 455/414; 455/421
(58) Field of Search ................................ 455/403, 414, 455/421, 422, 426, 432, 433, 435, 456, 457, 459, 552, 575, 450

(56) References Cited

U.S. PATENT DOCUMENTS

| | | | |
|---|---|---|---|
| 5,121,126 A | | 6/1992 | Clagett ........................ 455/456 |
| 5,956,637 A | * | 9/1999 | Ericsson et al. ............. 455/414 |
| 6,226,519 B1 | * | 5/2001 | Van Doorselaer et al. .. 455/450 |
| 6,324,402 B1 | * | 11/2001 | Waugh et al. ............... 455/433 |

FOREIGN PATENT DOCUMENTS

| | | |
|---|---|---|
| EP | 0 858 237 A2 | 8/1998 |
| GB | 2 313 257 A | 11/1997 |

OTHER PUBLICATIONS http://docbase.etsi.fr/Tech–org/smg/Document/smg1/SMG1–UMTS–Specifications/NEW/with reference TR22.70 V30.0.0(1998–03) Universal Mobile Telecommunication System (UMTS); Service Aspects; Virtual Home Environment (VHE)(UMTS 22.70 version 3.0.0).

Stengal, R. et al.: "CT–2 Telepoint Site Locater" Apr. 1, 1991, Motorola Technical Developments, vol. 12, NR. 29, p. 146, XP000229313.

* cited by examiner

*Primary Examiner*—Nay Maung
*Assistant Examiner*—Quochien B. Vuong
(74) *Attorney, Agent, or Firm*—Sughrue Mion, PLLC

(57) ABSTRACT

A system (SP) to provide a service to a user of a first terminal (T1) of a telecommunication network includes a retriever (RET) to retrieve from storage, in accordance with a coverage area (Ai), a location information (LOC-A2) that is associated by the information storage with the coverage area (Ai). The coverage area (A2) is one of a set of coverage area's (A1, A2, A3, A4, A5, A6) of the universal mobile telecommunication system. Each one (A2) of the coverage areas (A1, A2, A3, A4, A5, A6) is, respectively, associated with a location information (LOC-A2) of a set of location information (LOC-A1, LOC-A2, LOC-A3, LOC-A4, LOC-A5, LOC-A6). In the event the terminal (T1) is located within such a coverage area (A2), the first terminal (T1) is enabled to access the predefined universal mobile telecommunication service. The system further includes a first determiner (DET1) adapted to select, upon receiving an initiation signal (INIT) from the system, a selected location information (LOC-A2) based upon predefined rules and upon one or more location information (LOC-A2, LOC-A3) that are retrieved from storage. The first determiner (DET1) furthermore provides the selected location information (LOC-A2) to forwarder (FORW) which is coupled to the retriever (RET). The forwarder (FORW) is enabled to forward the selected location information (LOC-A2) to the user. Thereby, the transportation of the first terminal (T1) to the selected coverage area (A2) according to the forwarded selected location.

10 Claims, 2 Drawing Sheets

SERVICE MEANS TO PROVIDE A SERVICE TO A USER, METHOD REALIZED BY SUCH A SERVICE MEANS AND A TELECOMMUNICATION NETWORK INCLUDING SUCH A SERVICE MEANS

BACKGROUND OF THE INVENTION

The present invention relates to a service means to provide a service to a user of a first terminal of a telecommunication network, to a method realized by such a service means and to a telecommunication network including such a service means.

In order to provide an indication of the background art which can be regarded as useful for understanding the invention reference is made to the document European Telecommunication Standards Institute Standard:

TR 22.70 V3.0.0 (1998–03) entitled *"Universal Mobile Telecommunication System (UMTS); Service Aspects; Virtual Home Environment (VHE) (UMTS 22.70 version 3.0.0).*

This document describes the Virtual Home Environment concept and its constituent parts of a Universal Mobile Telecommunication System. A concept called service environment is introduced to describe how virtual home environment services will be made available on demand to a user traveling with its terminal in any location. The concept of virtual home terminal is discussed in order to describe how a virtual home environment can be made available in any terminal. A virtual home environment is defined as a system concept for personalized service portability, across network boundaries and between terminals. The concept of the virtual home environment is such that universal personal telecommunication system UMTS users are consistently presented with the same personalized features in whatever network and whatever terminal, wherever the user may be located. The exact configuration available to a user at any instant will be dependent upon the capabilities of the user service identity module, called hereafter USIM, terminal equipment and network currently being used or on the subscription restriction. Such a USIM is a unique personal identification of a user to a subscriber and a service provider. A user with its USIM in another terminal, receives maximum capability provided depending on the limitation of the terminal.

A virtual home environment is created by a combination of the capabilities located in the service provider, network operators and the terminal equipment. In effect, the virtual home environment of a user is considered as a distributed user profile. The profile outline is owned by the service provider, and it is distributed between the terminal equipment, personal identification card, network operator and service provider. This means that to the service provider, the virtual home environment appears as a list of capabilities, preferences and settings appropriate to the user and its subscriber. It is also described in the above cited document that a commercial relationship is required between a service provider and a network operator, either directly or indirectly.

The components involved in realization of a virtual home environment of a user are the following: one user, one service provider, one or more value added service providers i.e. content providers of services such as video on demand or entertainment information provider, one USIM i.e. unique personal identification of the user, one IC card, one subscriber, one subscription of the subscriber to the above mentioned service provider, one or more terminals, one or more network operators.

A user is associated with one service provider and the service provider provides virtual home environment according to the subscription. The service provider can use a plurality of network operators in order to support the virtual home environment for the user.

Individual users have a virtual home environment which is based on a subset of the total services. Whilst the user may have a set of services he would expect to be offered, these are only offered if permitted by the subscriber and the service provider. From the user's point of view, the use of the network is hidden.

Compared to existing telecommunication networks such as a mobile telecommunication network GSM, a Universal Mobile Telecommunication System UMTS provides more advanced access capabilities such as e.g. higher available bandwidth, higher Quality Of Service and QOS negotiations. This provides known service providers and network operators more capabilities to offer services to its users. Indeed, existing services of e.g. a GSM network could be presented in a more user friendly way by e.g. representing the existing services with icons and, furthermore, advanced services will be offered by exploiting the advanced UMTS access capabilities.

Currently, a telecommunication network such as GSM network provides with the existing access antenna's a global coverage whilst the introduction of UMTS i.e. the third generation of mobile systems, only provides a very limited so called island coverage. Indeed, a user which is located with its terminal outside such an UMTS coverage area can only get access to the limited set of services or less advanced services provided by a service provider of a telecommunication system with a global coverage and is not able to access a richer set of services provided by an UMTS system.

SUMMARY OF THE INVENTION

An object of the present invention is to provide a service means of a telecommunication network such as the above known service providers but which has not the above described drawback, i.e. which is able to provide a service to a user of a first terminal of a telecommunication network which enables the user to get access to a richer set of services provided by an UMTS network.

According to the invention, this object is achieved by means of the service means described in claim 1, by the method of claim 8 realized by such a service means and by the telecommunication network of claim 9 including such a service means.

The invention is based on the insight that by providing to a user of a first terminal of a telecommunication network, location information concerning the location of a UMTS coverage area, the user is enabled to transport its first terminal to this UMTS coverage area where its first terminal is enabled to access the richer set of services e.g. a predefined universal mobile telecommunication service of a universal mobile telecommunication system.

Therefor, according to the invention a retrieving means, a first determining means and a forwarding means is included in the service provider.

The retrieving means is included to retrieve with a coverage area from a storing means a location information that is related to this coverage area. The storing means stores a plurality of relations between a coverage area of such a UMTS network and its respectively related location information. In the event when a user with its first terminal is located outside each coverage area of the plurality of coverage area's and desires to use a predefined UMTS service, a location information which is associated to a coverage area is determined according to this storing means by the service means. In this way, the retrieving means retrieves one or more location information and provides it to the first determining means.

The first determining means that is coupled to the retrieving means selects, upon receiving of an initiation signal, out of one or more retrieved location informations a selected location information. This selection is based upon predefined rules.

The selected location information is provided to the forwarding means.

The forwarding means forwards the selected location information towards the user. In this way the user is enabled to transport its first terminal to the selected coverage area according to the selected location information. Indeed, the user might walk or drive to the provided selected location information. Once the first terminal is located inside the selected coverage area, the first terminal is enabled to access the predefined universal mobile telecommunication service.

It has to be explained that an initiation signal can be generated when a users wants to use a predefined UMTS service e.g. by selecting it on the display of its terminal and that the UMTS service is not available. Indeed, when the user is located in a location without coverage for this UMTS system, he can not reach this UMTS system. However, a service provider of a telecommunication network which provides coverage for the actual location of the user can give a reaction to this attempt by generating such an initiation signal an by initiating the service means according to the present invention and by executing the method of the invention.

It is clear to a person skilled in the art that the user must have permission to access the predefined universal mobile telecommunication service in order to receive this access once being located within the selected coverage area. The user must e.g. be subscribed to the predefined UMTS service or in the event when a GSM operator wants to promote its UMTS system he could provide the predefined UMTS service for free to its UMTS users.

A possible place to store the relations between the coverage area's and the location information of the coverage area's is at the network operator's location. Indeed, it must be clear that location information of coverage area's of an UMTS system can be subject to changes as long as the UMTS network is still in evolution. In such a case it can be preferred to store location information in a more centralized way, i.e. included in the network. In this way the service means is able to retrieve with its retrieving means the location information by e.g. transmitting a "request for information" signal to the network operator. The network operator returns upon receiving of such a signal the requested information to the service means.

Another possible implementation is that the storing means is included in the service means itself. This is described in claim 2. Such an implementation has the advantage that retrieving the location information can be executed faster since the network operator doesn't need to be interrogated.

A further characteristic feature of the present invention becomes clear when the service means of the present invention is included in a service provider of the telecommunication network. According to this implementation the selected location information is forwarded towards the user by the forwarding means via the network and a second terminal. Therefor the forwarding means includes a generating means and a transmitting means. The generating means is coupled to the first determining means and includes the selected location information into a service message. This service message is transmitted by a transmitting means and via the telecommunication network to a receiver of the second terminal of the user. The second terminal receives the service message with the included selected location information by means of a receiver. Thereby the second terminal is enabled to generate an output by means of an output means towards the user that includes the selected location information. The output means is e.g. a display that displays the location information towards the user or a speaker that provides the location information by means of sound. This is described in claim 3. Such a second terminal of the user can be implemented by e.g. a general positioning system which is enabled to receive service messages of a service provider and which shows on a display towards the user the selected location information which includes e.g. a local part of a city map with a highlighted coverage area on it.

It has to be understood that a possible implementation of the service means according to the invention is that the first terminal which will be enabled by the method of the invention to receive the UMTS service is constituted by the second terminal whereto the service means transmits the service message. In this way the user only has to take care of one terminal. This is described in claim 4.

Another implementation of the service means is described in claim 5. The service means is included in a second terminal of the user and the forwarding means includes output means that are coupled to the first determining means. The output means generates directly an output towards the user that includes the selected location information. According to this implementation and in the event when e.g. the storing means is also included in the service means the retrieving means doesn't need to generate a "request for information" anymore. Indeed, when the set of coverage area's reached a more stable situation, it might be convenient that the service means includes the storing means and that the service means according to the invention is included in a second terminal. In this way, the location information stored in a terminal of the user might be subject to commercial advantage of the terminal.

Furthermore, when the second terminal of the previous paragraph is realized by the first terminal the user has all the needed information directly available on one single terminal which is also able to access the UMTS service once it is brought into the coverage area. This situation has the advantage that the user does not need to carry with him different terminals but only one. A possible implementation of the storing means of this service means is the service identity module SIM that is integrated on an IC card of the terminal. This is described in claim 6.

It has to be remarked that according to the previous described implementations of the invention, it is clear to a person skilled in the art that the location information could be provided in different kind of formats during the storing, retrieving, selecting and forwarding procedures. Indeed, the location information to be stored in a storing means e.g. a memory is preferable in a short format e.g. location coordinates referring to a city map in order to store all location information as economical as possible. Such a reference can refer to other kind of data bases which includes more detailed information about the location of the coverage area's e.g. names of streets, longitude/latitude coordinates. In order to transmit service messages including location information the preferred format depends on the network and terminal capabilities. In the event when e.g. not much bandwidth is available, a rather short format will be preferred and the location information is e.g. provided in an encoded and encrypted format. On the other hand when e.g. an optical wideband network is used to transmit a service message to a second terminal of the user more location information data can be transmitted. Furthermore, the output of the terminal towards the user must be in an understandable format for the user and depends on the kind of output means used. The format of the location information is provided in an understandable way by displaying e.g. a street name of a city.

It has to be explained that a straight forward implementation of the predefined rules is e.g. with a predefined coverage area. In this way the retrieving means always retrieves, according to this predefined coverage area, the same location information that is forwarded to the user. All users will be guided to the same predefined coverage area. Such an implementation provides however not much flexibility.

Another implementation is described in claim 7. The service provider further includes second determining means to determine an actual first terminal location that is an actual location of the first terminal. The actual first terminal location is provided to the first determining means whereby the first determining means is further adapted to base its selection also upon the actual first terminal location. In this way, a selection out of the known available coverage area's is made in relation to the actual location of the first terminal. The selection is furthermore based upon predefined rules such as e.g. "the coverage area that is located the closest to the actual first terminal location" or "the coverage area that is located the closest to the actual first terminal location and that is the easiest to reach by feet" or "the coverage area that is to be reached in the most fastest way by e.g. car and by taking into account the actual local traffic at that time". In this way it is clear to a person skilled in the art that the selected location information includes more information than the identification of the selected coverage area as such. Even more, the selected location information can include a limited set of location informations being associated to a limited set of coverage area's which enables the user to make its own selection according to its preferences. Even more, the content of a storing means according to the invention might include location information of coverage area's that belong to different UMTS networks which belong e.g. to different operators. An indication of the operator could be provided together with the location information for selecting on of e.g. overlapping coverage area's of different operators.

It has to be explained that similar to the storing means also the selection of the location information can be executed by the network operator. According to this implementation the second determining means is e.g. also included by the network operator in order to know the actual location of the first terminal. The predefined rule of the first determining means is e.g. "closest coverage area" whereby the retrieving means retrieves location information according to the "closest coverage area". The network operator determines with the available actual first terminal location and the location information of the coverage area stored in its memory, the closest coverage area to the first terminal and provides to the retrieving means the associated location information. This location information is forwarded to the user by the service means.

As already mentioned above, the telecommunication network via which a service message is provided to a second terminal can be implemented by different kind of networks. It should be convenient for an operator being the owner of a GSM network and also of an UMTS network, to provide via its GSM network a service according to the present invention and to offer in this way access to its UMTS network. This is described in claim 10. However, providing the service of the present invention via a fixed network might have other kind of advantages such as the available bandwidth, as already mentioned above.

It should be noticed that the term "including" used in the claims, should not be interpreted as being limitative to the means listed thereafter. Thus, the scope of the expression "a device including means A and B" should not be limited to devices consisting only of components A and B. It means that with respect to the present invention, the only relevant components of the device are A and B.

Similarly, it is to be noted that the "coupled", also used in the claims, should not be interpreted as being limitative to direct connections only. Thus, the scope of the expression "a device A coupled to a device B" should not be limited to devices or systems wherein an output of the device A is directly connected to an input of device B. It means that there exists a path between an output A and an input B which may,be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

First the working of the service means of the invention will be explained by means of a functional description of the functional blocks shown in the figures. Based on this description, implementation of the functional blocks will be obvious to a person skilled in the art and will therefor not be described in further detail. In addition, the principle working of the method to provide a service to a user will be described.

Figure 1:
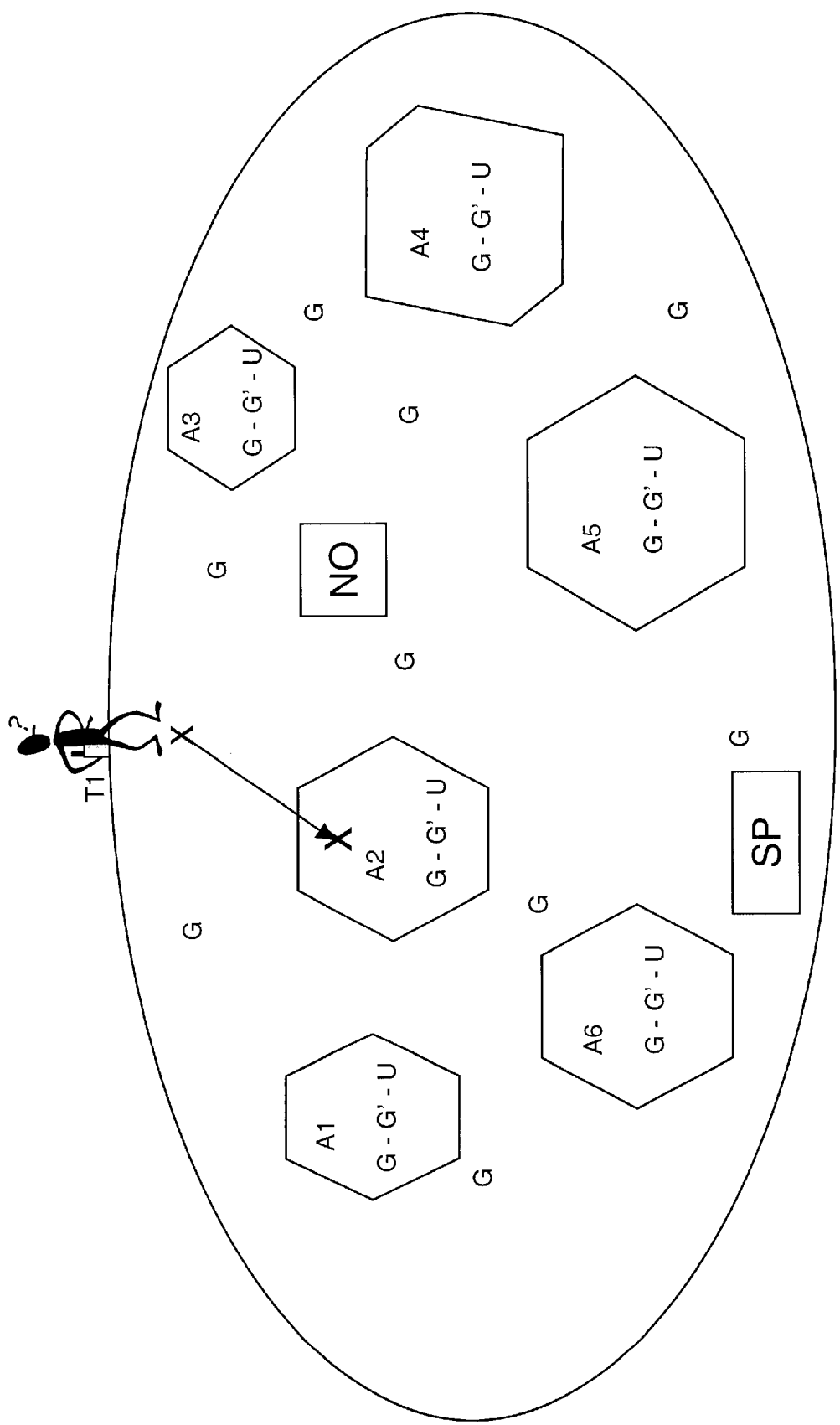
FIG. 1 illustrates a telecommunication network according to the present invention.

Referring to FIG. 1, a telecommunication network is shown. The telecommunication includes a global coverage for a mobile network that is able to provide a set of services G and an island coverage for a universal mobile telecommunication system UMTS that is able to provide an extended set of services G, G'and U. The set of services, called G, of the mobile system, are typical GSM services. The richer set of services of the UMTS system are extended GSM services, called G', and advanced UMTS services, called U. The UMTS system includes different UMTS coverage islands: A1, A2, A3, A4, A5, A6.

The telecommunication network includes a service provider and a network operator NO.

It is preferred for this particular embodiment to include the service means SP according to the present invention into a service provider of the telecommunication network.

Furthermore a user is located within the global coverage area of the mobile network but outside each one of the island coverage areas of the UMTS system. The user has a terminal T1 available to provide services. Since the user is located outside each one of the island coverage areas, the user is not able to access the richer set of UMTS services.

Figure 2:
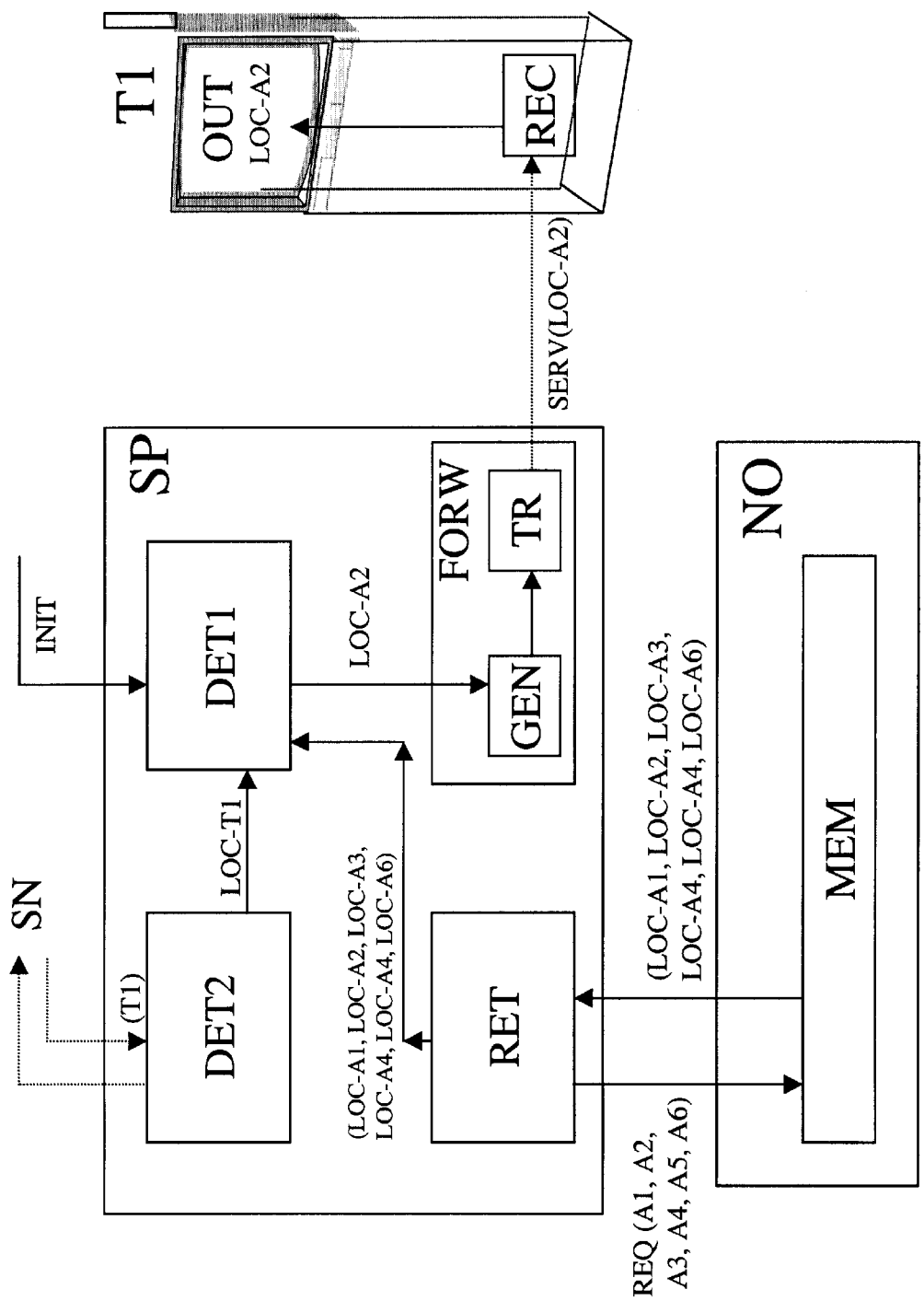
FIG. 2 illustrates a service means SP according to the present invention, a network operator NO and a terminal T1.

Referring to FIG. 2, a service provider including a service means according to the present invention, a network operator NO and a terminal T1 are shown.

In order not to overload this description, FIG. 1 and FIG. 2 the service means according to the present invention and the service provider including such a service means are both referred to by "SP".

The terminal T1 of the user is adapted to provide to the user, if located within one of the UMTS coverage areas, a richer set of services such as e.g. a larger display to enable notification of larger messages. The terminal T1 includes a receiver and an output OUT. The receiver REC is included to receive a service message SERV(LOC-A2) of the service provider SP. The output OUT is coupled to the receiver REC and is implemented by such a larger display. The output is able to display the location information of the coverage areas e.g. LOC-A2 that is forwarded by the receiver REC. Furthermore the terminal T1 includes functional blocks to receive and to transmit data signals and control signals according to a usual working a mobile terminal. Since this goes beyond the aim of the invention, these functional blocks are not shown and are not discussed here in further detail. However, it is worthwhile to mention that the terminal T1 includes the required functional blocks to enable a serving network SN i.e. network via which the terminal gets access to the telecommunication network, its location. Determination of the location of the terminal T1 is e.g. executed by a control signal that is transmitted by such a serving network and returned by the terminal T1.

The network operator NO includes a memory MEM to store relations between references to the coverage areas A1, A2, A3, A4, A5 and A6 and location information of these coverage areas LOC-A1, LOC-A2, LOC-A3, LOC-A4, LOC-A5, LOC-A6, respectively. According to this memory MEM e.g. coverage area A2 is associated to location information LOC-A2 of coverage area A2. The location information LOC-A2 is implemented in this particular embodiment by names of streets of the city. The memory MEM is included in the network operator to receive a request from the service provider SP for information e.g. REQ(A2) with one or more of the coverage areas e.g. A2 as argument. The memory MEM extracts the coverage area of the request for information REQ(A2) and determines the associated location information e.g. LOC-A2. The associated location information LOC-A2 is provided by the memory MEM to the service provider SP. For this particular embodiment it is preferred to request location information of all six coverage areas: REQ (A1, A2, A3, A4, A5, A6). The memory MEM returns the requested information: LOC-AL, LOC-A2, LOC-A3, LOC-A4, LOC-A5, LOC-A6.

The service provider SP includes a retrieval RET, a first determiner DET1, a second determiner DET2 and a forwarder FORW.

The second determiner DET2 is coupled to an input/output of the service provider SP that is shown by two arrows pointing inside/outside the service provider SP. The first determiner DET1 is coupled between the second determiner DET2 and the retriever RET. The retriever RET is coupled between the first determiner DET1 and an input/output of the service provider SP. This last input/output is shown by two arrows pointing inside/outside the service provider and are coupled to the network operator NO.

According to this preferred embodiment the network operator NO is coupled to the service provider SP via a telecommunication link that is part of a fixed telecommunication network. This is shown by full arrows. Furthermore the service provider is enabled to communicate with the terminal T1 via a mobile network. This is shown by dotted arrows.

The second determiner DET2 is adapted to determine an actual terminal location LOC-T1 that is the actual location of the terminal T1 and to provide this actual terminal location LOC-T1 to the first determiner DET1. Determination of the actual terminal location can be executed by the service provider itself according to the known method described above. However it is preferred for this particular embodiment to retrieve this information from the serving network of the second determiner DET2 transmits a request to the serving network that includes a reference to the terminal T1 as argument and receives the requested information i.e. LOC-A2. This is shown by the dotted arrows.

The retriever RET is included to retrieve RET, as it is explained above, from the memory MEM location information. Furthermore the retriever RET provides the location information LOC-A1, LOC-A2, LOC-A3, LOC-A4, LOC-A4, LOC-A5, LOC-A6 to the first determiner DET1.

The first determiner DET1 is adapted to determine a selected coverage area according the received actual terminal location LOG-T1, predefined rules, and the retrieved location information from the retriever RET. For this particular embodiment it is preferred to define the rule to select one of the coverage areas as "the closest coverage area in bird's eye view to the actual location of the terminal". This selection process is implemented by a processor (not shown) and provides a selected location information e.g. LOC-A2. The selected location information is provided by the first determiner DET1 to the forwarder FORW.

The forwarder FORW includes a generator GEN and a transmitter TR. The generator GEN is coupled to the first determiner DET1 and to the transmitter TR. The transmitter TR is implemented by a transmitter of radio signals.

The generator receives the selected location information e.g. LOC-A2 and includes this information into a service message e.g. SERV(LOC-A2). This service message is provided to the transmitter TR.

The transmitter TR transmits the service message e.g. SERV(LOC-A2) to the terminal T1.

The working of the method of the present invention will now be described by means of an example that describes the actual working of the service provider during a predefined time period.

As mentioned above, the user is located outside each one of the coverage area's of the UMTS system and desires to get access to a the richer set of services of this system.

An attempt of the user to log on to the UMTS system e.g. by selecting on the display of its terminal a predefined UMTS service returns without success. However, this attempt is noticed by the serving network SN that transmits an initiation signal INIT to the first determiner DET1 of the service provider SP. The initiation signal INIT includes a reference to the terminal T1 of the user. Furthermore the serving network SN provides to the second determiner DET2 the actual terminal location LOC-T1 of the terminal T1. The actual terminal location LOC-T1 is provided by the second determiner DET2 to the first determiner DET1. The retriever RET retrieves from the memory MEM included in the network operator NO the needed location information. Therefor the retriever RET transmits a request for information REQ(A1 A2, A3, A4, A5, A6) to the network operator NO. The network operator NO returns the requested location information and the retriever RET provides the set of location information LOC-A1, LOC-A2, LOC-A3, LOC- A4, LOC-A5, LOC-A6 of the six coverage area's A1, A2, A3, A4, A5 and A6 to the first determiner DET.

The first determiner processes all this information in order to select "the closest coverage area in bird's eye view to the actual location of the terminal" and provides hereby a selected location information. Presume a situation as shown on FIG. 1 that coverage area A2 is located the closest to the user with its terminal T1. This means that the location information LOC-A2 turns out to be the selected location information LOC-A2. The location information LOC-A2 is provided by the first determiner DET1 to the generator GEN. The generator GEN includes the location information LOC-A2 into a service message SERV(LOC-A2) and provides this to the transmitter TR. The transmitter TR transmits this service message to the terminal T1. The service message SERV(LOC-A2) is received by the receiver REC of the terminal T1 whereby the location information LOC-A2 is extracted from this service message. The location information LOC-A2 is provided to the output OUT of the terminal T1. The user reads the location information LOC-A2 i.e. a street name and transports it terminal to this street that is located within the coverage area A2. Once arrived there, the user makes another attempt and selects on its terminal T1 a predefined UMTS service that turns out with success. The terminal T1 gets access to the UMTS system since it is now located within one of the UMTS coverage area's i.e. A2.

While the principles of the invention have been described above in connection with specific apparatus, it is to be clearly understood that this description is made only by way of example and not as a limitation on the scope of the invention, as defined in the appended claims.

What is claimed is:

1. A system for providing a service to a user of a first terminal (T1) of a telecommunication network, said user desiring to use a predefined universal mobile telecommunication service of a universal mobile telecommunication system, characterized in that said system includes:

an information retriever (RET) retrieving at least one location information (LOC-A2) from information storage (MEM) corresponding to at least one location coverage area (A2) belonging to a system coverage area of said universal mobile telecommunication system, said system coverage area comprising at least one location coverage area (A1, A2, A3, A4, A5, A6) and said information storage associating each said location coverage area with a respective location information such that, when said first terminal (T1) is located within a particular location coverage area (A2) said first terminal (T1) is enabled to access said predefined universal mobile telecommunication service, said retriever thereby providing at least one retrieved location information (LOC-A2) to a first determiner (DET1);

said first determiner (DET1) being coupled to said information retriever (RET) and being adapted to select, upon receiving an initiation signal (INIT) from said system, a selected location information (LOC-A2) based upon predefined rules and based upon the at least one location information (LOC-A2, LOC-A3) retrieved from said information storage (MEM), and to provide said selected location information (LOC-A2) to a forwarder; and said forwarder (FORW) being coupled to said first determiner (DET1) and enabled to forward said selected location information (LOC-A2) to said user and to thereby enable transportation of said first terminal (T1) to said selected coverage area (A2) according to said forwarded selected location information (LOC-A2) and to thereby enable said first terminal (T1) to access said predefined universal mobile telecommunication service.

2. The system according to claim 1, characterized in that said system further includes said information storage (MEM) storing at least one relation between one of said at least one location coverage area (A1, A2, A3, A4, A5, A6) and one of said at least one location information (LOC-A1, LOC-A2, LOC-A3, LOC-A4, LOC-A5, LOC-A6).

3. The system according to claim 1, characterized in that said information retriever (RET), said first determiner (DET1), and said forwarder (FORW) are included in a service provider and that said forwarder includes:

a generator (GEN) coupled to said first determiner (DET1) to generate a service message (SERV(LOC-A2)) including said selected location information (LOC-A2); and a transmitter (TR) coupled between said generator (GEN) and an output (OUT) of said system to transmit said service message (SERV(LOC-A2)) via said telecommunication network to a second terminal (T2) of said user and to thereby enable said second terminal (T2) to receive said service message (SERV(LOC-A2)) and to generate an output (OUT(LOC-A2)) including said selected location information (LOC-A2) towards said user.

4. The system according to claim 3, characterized in that said second terminal (T2) is realized by said first terminal (T1).

5. The system according to claim 1, characterized in that said system is included in a second terminal (T2) of said user and that said forwarder (FORW) includes an output circuit (OUT) coupled to said retriever (RET) to generate an output (LOC-A2) towards said user that includes said selected location information (LOC-A2).

6. The system according to claim 5, characterized in that said second terminal (T2) is realized by said first terminal (T1).

7. The system according to claim 1, characterized in that said system further includes a second determiner (DET2) adapted to determine an actual first terminal location (LOC-T1) and to provide said actual first terminal location (LOC-T1) to said first determiner (DET1) whereby said first determiner is further adapted to base said selection also upon said actual first terminal location (LOC-T1).

8. A telecommunication network, characterized in that said telecommunication network includes a system according to claim 1.

9. The telecommunication network according to claim 8, characterized in that said telecommunication network is a mobile network.

10. A method to be executed by a system in order to provide a service to a user of a first terminal (T1) of a telecommunication network, said user desiring to use a predefined universal mobile telecommunication service of a universal mobile telecommunication system, characterized in that said method includes the steps of: at least one location information (LOC-A1, LOC-A2, LOC-A3, LOC-A4, LOC-A5, LOC-A6).

storing in an information storage (MEM) at least one relation between at least one location coverage area (A2) belonging to a system coverage area of a universal mobile telecommunication system and a location information (LOC-A2) said location coverage area belonging to a system coverage area of said universal mobile telecommunication system and each location coverage area being associated with a respective location information such that in the event said first terminal (T1) is located within one coverage area (A2) said first terminal (T1) is thereby enabled to access said predefined universal mobile telecommunication service;

retrieving from said information storage, in accordance with a coverage area (A2), at least one location information (LOC-A2) according to said stored relation and providing thereby at least one retrieved location information (LOC-A2);

selecting, upon receiving of an initiation signal (INIT) said stem, a selected location information (LOC-A2) based upon predefined rules and based upon the at least one location information (LOC-A2, LOC-A3) retrieved; and forwarding said selected location information (LOC-A2) to said user in order to enable transportation of said first terminal (T1) to said selected coverage area (A2) associated with said forwarded selected location information (LOC-A2) and to thereby enable said first terminal (T1) to access said predefined universal mobile telecommunication service.

* * * * *